United States Patent
Jang et al.

(10) Patent No.: US 8,114,375 B2
(45) Date of Patent: Feb. 14, 2012

(54) PROCESS FOR PRODUCING DISPERSIBLE NANO GRAPHENE PLATELETS FROM OXIDIZED GRAPHITE

(75) Inventors: Bor Z. Jang, Centerville, OH (US); Aruna Zhamu, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 386 days.

(21) Appl. No.: 12/231,413

(22) Filed: Sep. 3, 2008

(65) Prior Publication Data

US 2010/0055025 A1 Mar. 4, 2010

(51) Int. Cl.
 C01B 31/04 (2006.01)
 C09C 1/56 (2006.01)
(52) U.S. Cl. ............ 423/448; 423/460; 423/451.1; 252/378 R; 977/755
(58) Field of Classification Search .......... 423/448, 423/415.1, 460; 252/378 R
See application file for complete search history.

(56) References Cited

U.S. PATENT DOCUMENTS

| | | | |
|---|---|---|---|
| 2,798,878 | A | 7/1957 | Hummers |
| 4,987,175 | A | 1/1991 | Bunnell, Sr. |
| 5,019,446 | A | 5/1991 | Bunnell, Sr. |
| 5,186,919 | A | 2/1993 | Bunnell, Sr. |
| 6,287,694 | B1 | 9/2001 | Zaleski et al. |
| 6,596,396 | B2 | 7/2003 | Harita et al. |
| 6,828,015 | B2 | 12/2004 | Harita et al. |
| 6,872,330 | B2 | 3/2005 | Mack et al. |
| 7,071,258 | B1 | 7/2006 | Jang et al. |
| 2002/0054995 | A1 | 5/2002 | Mazurkiewicz |
| 2003/0129305 | A1 | 7/2003 | Wu et al. |
| 2007/0092432 | A1* | 4/2007 | Prud'Homme et al. ...... 423/448 |

OTHER PUBLICATIONS

U.S. Appl. No. 11/442,903, filed Jun. 26, 2006, B. Z. Jang.
U.S. Appl. No. 10/858,814, filed Jun. 3, 2004, B. Z. Jang, et al.
U.S. Appl. No. 11/007,614, filed Dec. 7, 2006, V. Petrik.
U.S. Appl. No. 11/363,336, filed Feb. 27, 2006, L. T. Drzal, et al.
U.S. Appl. No. 11/361,255, filed Feb. 24, 2006, L. T. Drzal, et al.
U.S. Appl. No. 10/659,577, filed Sep. 10, 2003, L. T. Drzal, et al.
U.S. Appl. No. 11/243,285, filed Oct. 4, 2005, J. D. Udy.
U.S. Appl. No. 11/249,404, filed Oct. 14, 2005, R. Prud'Homme.
U.S. Appl. No. 11/800,728, filed May 8, 2007, A. Zhamu, et al.

* cited by examiner

Primary Examiner — Emily Le
Assistant Examiner — Rebecca Lee
(74) Attorney, Agent, or Firm — Mark Lavy; Thompson Hine LLP

(57) ABSTRACT

The present invention provides a process for producing nano graphene platelets (NGPs) that are dispersible and conducting. The process comprises: (a) preparing a graphite intercalation compound (GIC) or graphite oxide (GO) from a laminar graphite material; (b) exposing the GIC or GO to a first temperature for a first period of time to obtain exfoliated graphite; and (c) exposing the exfoliated graphite to a second temperature in a protective atmosphere for a second period of time to obtain the desired dispersible nano graphene platelet with an oxygen content no greater than 25% by weight, preferably below 20% by weight, further preferably between 5% and 20% by weight. Conductive NGPs can find applications in transparent electrodes for solar cells or flat panel displays, additives for battery and supercapacitor electrodes, conductive nanocomposite for electromagnetic wave interference (EMI) shielding and static charge dissipation, etc.

23 Claims, 3 Drawing Sheets

PROCESS FOR PRODUCING DISPERSIBLE NANO GRAPHENE PLATELETS FROM OXIDIZED GRAPHITE

FIELD OF THE INVENTION

The present invention relates generally to the field of carbon- or graphite-based nano materials, and more particularly to nano graphene platelets (NGPs), including their oxidized versions (graphite oxide nano platelets), that are dispersible in a liquid medium or a matrix material.

BACKGROUND OF THE INVENTION

The present discussion of the prior art will make reference to the patent literature and technical papers listed at the end of this section.

The nanoscale graphene platelet (NGP) or graphene nano-sheet is an emerging class of nano materials. An NGP is a nanoscale platelet composed of one or more layers of a graphene plane, with a platelet thickness from less than 0.34 nm to 100 nm. In a graphene plane, carbon atoms occupy a 2-D hexagonal lattice in which carbon atoms are bonded together through strong in-plane covalent bonds. In the c-axis or thickness direction, several graphene planes may be weakly bonded together through van der Waals forces to form a multi-layer NGP. An NGP may be viewed as a flattened sheet of a carbon nano-tube (CNT), with a single-layer NGP corresponding to a single-wall CNT and a multi-layer NGP corresponding to a multi-wall CNT.

For more than six decades, scientists have presumed that a single-layer graphene sheet (one atom thick) could not exist in its free state based on the reasoning that its planar structure would be thermodynamically unstable. Somewhat surprisingly, several groups worldwide have recently succeeded in obtaining isolated graphene sheets [Refs. 1-9]. NGPs are predicted to have a range of unusual physical, chemical, and mechanical properties. Several unique properties associated with these 2-D crystals have been discovered. In addition to single graphene sheets, double-layer or multiple-layer graphene sheets also exhibit unique and useful behaviors. In the present context, single-layer and multiple-layer graphene sheet structures are collectively referred to as NGPs. Graphene platelets may be oxidized to various extents during their preparation, resulting in graphite oxide (GO) platelets. Hence, although NGPs preferably or primarily refer to those containing no or low oxygen content, they can include GO nano platelets of various oxygen contents.

Although practical electronic device applications for graphene are not envisioned to occur within the next 5-10 years, its application as a nano filler in a composite material is imminent. However, the availability of processable graphene sheets in large quantities is essential to the success in exploiting composite and other applications for graphene. The present patent application addresses issues related to the production of processable or dispersible NGPs.

The processes for producing NGPs and NGP nanocomposites have been recently reviewed by the applicants, Jang and Zhamu [Ref. 9]. Basically, there are four different approaches that have been followed to produce NGPs. Their advantages and shortcomings are briefly summarized as follows:

Approach 1: Formation and Reduction of Graphite Oxide (GO) Platelets

The first approach entails treating laminar graphite (e.g., in most cases, natural graphite powder) with an intercalant and an oxidant (e.g., concentrated sulfuric acid and nitric acid, respectively) to obtain a graphite intercalation compound (GIC) or, actually, graphite oxide (GO). The obtained GIC or GO is then subjected to exfoliation using either a thermal shock exposure or a solution-based graphene separation approach.

Technically, the acid-treated graphite is actually oxidized graphite or graphite oxide (GO), rather than pristine graphite. In the thermal shock exposure approach, the GIC or GO is exposed to a high temperature (typically 800-1,050° C.) for a short period of time (typically 15 to 60 seconds) to exfoliate the treated graphite. Typically, the exfoliated graphite oxide is then subjected to a further sheet or flake separation treatment using air milling, mechanical shearing, or ultrasonication in a liquid (e.g., water).

In the solution-based graphene separation approach, the GO powder is dispersed in water or aqueous alcohol solution, which is subjected to ultrasonication. Alternatively, the GO powder dispersed in water is subjected to some kind of ion exchange or purification procedure in such a manner that the repulsive forces between ions residing in the inter-planar spaces overcome the inter-graphene van der Waals forces, resulting in graphene layer separations.

In both the heat- or solution-induced exfoliation approaches, the resulting products are GO platelets that must undergo a further chemical reduction treatment to reduce (but normally not eliminate) the oxygen content. Typically even after reduction, the electrical conductivity of GO platelets remains much lower than that of pristine graphene. Furthermore, the reduction procedure often involves the utilization of undesirable chemicals, such as hydrazine. In some cases of solution-based exfoliation, the separated and dried GO platelets were re-dispersed in water and then cast into thin GO films. These films were exposed to a high temperature, high vacuum environment for de-oxygenation, but the resulting GO platelets were no longer dispersible in water or other solvents.

Examples of Approach 1 are briefly discussed below:
  (a) Bunnell [10-12] developed a method in late 1988 that entailed intercalating graphite with a strong acid to obtain a GIC, thermally exfoliating the GIC to obtain discrete layers of graphite, and then subjecting the graphite layers to ultrasonic energy, mechanical shear forces, or freezing to separate the layers into discrete flakes. Although flakes as small as 10 nm were cited in the report [12], most of the flakes presented in the examples appeared to be thicker than 100 nm.
  (b) In a similar manner, Zaleski, et al. [13] used air milling to further delaminate thermally exfoliated graphite flakes. The resulting structures exhibited a specific surface area of 35 $m^2/g$, corresponding to an average flake thickness of approximately 25 nm.
  (c) Horiuchi, Hirata, and co-workers [14-19] prepared nano-scaled graphite oxide (GO) platelets, which they coined as carbon nano-films. These films were prepared by a two-step process—oxidation of graphite and purification of the resulting graphite oxide. The oxidation of graphite was conducted using the now well-known Hummer's method [20,21], which entailed immersing natural graphite particles in a mixture of $H_2SO_4$, $NaNO_3$, and $KMnO_4$ to obtain GICs that actually were GOs. By hydrolyzing the GIC, functional groups, such as acidic hydroxyl groups and ether groups, were introduced into the inter-graphene layer spaces. Each of the graphite oxide layers became a multiple-charge anion, having a thickness of approximately 0.6 nm. When the excess small ions derived from the oxidants (e.g., $NaNO_3$, and $KMnO_4$) were thoroughly removed by a purification process, many layers tended to automatically separate from each other due to interlayer electrostatic repulsion. The resulting GO layers formed a stable dispersion in water. According to Horiuchi, et al. [14], single-layer graphene was detected.

(d) It may be noted that the approach of using electrostatic repulsion to separate graphene oxide layers was pursued earlier in 1998 by Liu and Gong [22], as a first step in their attempt to synthesize polyaniline-intercalated GO. In a 3-D graphite crystal, the inter-layer spacing ($L_d$) is 0.335 nm, which is known to increase to 0.6-1.1 nm if graphite is oxidized to produce GO. Further, GO is hydrophilic and can be readily dispersed in aqueous solution.

(e) Dekany et al. [23] observed that the inter-graphene spacing in GO was increased to $L_d$=1.23 nm when GO particles were dispersed in 0.05 N NaOH solution. When dispersed in a 0.01 N NaOH solution, the spacing was essentially infinite, likely implying that GO was completely exfoliated to become a disordered structure.

(f) Chen et al. [24] exposed GO to a temperature of 1,050° C. for 15 seconds to obtain exfoliated graphite, which was then subjected to ultrasonic irradiation in a mixture solution of water and alcohol.

(g) Jang et al. [25] thermally expanded GIC or graphite oxide to produce exfoliated graphite and subjected exfoliated graphite to mechanical shearing treatments, such as ball milling, to obtain partially oxidized NGPs.

(h) Thermal exfoliation as a way of producing nano-structured graphite was also attempted by Petrik [26].

(i) Thermal exfoliation of intercalated graphite or graphite oxide was conducted by Drzal et al. [27] using microwaves as a heat source.

(j) Aksay, McAllister, and co-workers [7-9, 66] also used thermal exfoliation of GO to obtain exfoliated graphite oxide platelets, which were found to contain a high proportion of single-layer graphene oxide sheets, based on the BET method with nitrogen gas adsorption in the dry state and in an ethanol suspension with methylene blue dye as a probe.

(k) Several polar organic compounds and polymers have been intercalated into inter-graphene or inter-flake spaces to form intercalated or exfoliated GO nanocomposites. These include poly (vinyl alcohol) [28-30], poly (acrylamide) [31], and poly (acrylic acid) [32]. Intercalation of hydrophobic polymers, such as poly (vinyl acetate) [33], into GO was also achieved by in situ polymerization. Partial reduction of a polymer-GO to a polymer-graphene nanocomposite also could be accomplished electrochemically or chemically [22,34-37].

(l) Preparation of ultra-thin films by a layer-by-layer self-assembly approach from GO nano platelets and polymer electrolytes also has been investigated [38-44]. Although the original intent of these studies was primarily to fabricate self-assembled GO-poly (ethylene oxide) nanocomposites, their first step almost always involved exfoliation and separation of GO platelets. This was evidenced by the X-ray diffraction data of the resulting structures that showed complete disappearance of those diffraction peaks corresponding to graphite oxide or pristine graphite [38,40].

(m) Stankovich et al. [45] followed the approaches of Hirata et al. [17-19] to produce and disperse graphite oxide sheets in water to obtain stable colloidal dispersions. The graphite oxide dispersion was then reduced with hydrazine, a procedure previously used by Liu and Gong earlier [22], but in the presence of poly (sodium 4-styrenesulfonate). This process led to the formation of a stable aqueous dispersion of polymer-coated graphene platelets. Stankovich et al. [46] further developed a method to produce less hydrophilic GO platelets using an isocyanate treatment. However, unless stabilized by selected polymers, the chemically modified graphene sheets obtained through these methods tend to precipitate as irreversible agglomerates due to their hydrophobic nature. The resulting agglomerates became insoluble in water and organic solvents.

(n) Li et al. [47] overcame this issue by using ammonium to adjust the pH value of a dispersion of chemically modified graphene sheets in water, which served to maximize the charge density on the resulting graphene sheets. The resulting electrostatic forces acted to stabilize the aqueous suspension.

(o) Si and Samulski [48] reported a chemical route to aqueous solutions of isolated graphene sheets by reducing graphene oxide in three steps. (1) pre-reduction of graphene oxide with sodium borohydride at 80° C. for 1 h to remove the majority of the oxygen functionality; (2) sulfonation with the aryl diazonium salt of sulfanilic acid in an ice bath for 2 h; and (3) post-reduction with hydrazine (100° C. for 24 h) to remove any remaining oxygen functionality. The lightly sulfonated graphene can be readily dispersed in water at reasonable concentrations (2 mg/mL) in the pH range of 3-10. Isolated graphene sheets persist in the mixture of water and organic solvents including methanol, acetone, acetonitrile, thus making it possible to further modify its surface for applications such as reinforcements in composites. This is a very tedious process, nevertheless.

(p) Another very tedious process for the preparation of GO nano sheets, proposed by Becerril, et al. [67], entailed (1) intercalating-oxidizing graphite with a solution of $NaNO_3$ and $KMnO_4$ in concentrated $H_2SO_4$ for 5 days; (2) washing the oxidized graphite with 5 wt. % $H_2SO_4$ in water and reacting the washed oxidized graphite with a 30 wt. % aqueous solution of $H_2O_2$ to complete the oxidation; (3) removing inorganic anions and other impurities through 15 washing cycles that included centrifugation, discarding supernatant liquid, and re-suspending the solid in an aqueous mixture of 3 wt. % $H_2SO_4$ and 0.5 wt. % $H_2O_2$ using stirring and ultrasonication; (4) carrying out another set of centrifugation and washing procedures three times using 3 wt % HCl in water as the dispersion medium and then one more time using purified water to re-suspend the solid; (5) passing this suspension through a weak basic ion-exchange resin to remove remaining acid; and (6) drying the suspension to obtain a powder.

Approach 2: Direct Formation of Pristine Nano Graphene Platelets (q) Without going through a chemical intercalation route, Mazurkiewicz [49] claimed to have produced graphite nano platelets having an average thickness in the range of 1-100 nm through high-pressure milling of natural flake graphite. However, no evidence was presented [49] to show that truly thin platelets (e.g., those <10 nm in thickness) were produced.

(r) Shioyama [50] prepared a potassium-intercalated GIC from highly oriented pyrolytic graphite (HOPG), initiated in situ polymerization of isoprene or styrene in the inter-graphene spaces, and then thermally decomposed inter-graphene polymer chains at a high temperature (500-1,000° C.). The volatile gas molecules served to exfoliate graphite layers, and, after the volatile gas escaped, isolated graphene sheets were obtained. Unfortunately, Shioyama did not discuss the thickness of the isolated graphene sheets.

(s) Jang, et al. [3,4] succeeded in isolating single-layer and multi-layer graphene structures from partially carbonized or graphitized polymeric carbons, which were obtained from a polymer or pitch precursor. Carbonization involves linking aromatic molecules or planar cyclic chains to form graphene domains or islands in an essentially amorphous carbon matrix. For instance, polymeric carbon fibers were obtained by carbonizing polyacrylonitrile (PAN) fibers to a desired extent that the fiber was composed of individual graphene sheets isolated or separated from each other by an amorphous carbon matrix. The resulting fibers were then subjected to a solvent extraction, or intercalation/exfoliation treatment. Graphene platelets were then extracted from these fibers using a ball milling procedure.

(t) Mack, Viculis, and co-workers [51,52] developed a low-temperature process that involved intercalating graphite with potassium melt and contacting the resulting K-intercalated graphite with alcohol, producing violently exfoliated graphite containing many ultra-thin NGPs. The process must be carefully conducted in a vacuum or an extremely dry glove box environment since pure alkali metals, such as potassium and sodium, are extremely sensitive to moisture and pose an explosion danger. It is questionable if this process is easily amenable to the mass production of nano-scaled platelets. One major advantage of this process is the notion that it produces non-oxidized graphene sheets since no acid/oxidizer intercalation or a high temperature is involved.

(u) In 2004, Novoselov, Geim, and co-workers [1,2] prepared single-sheet graphene by removing graphene from a graphite sample one sheet at a time using a "Scotch-tape" method. Although this method is not amenable to large-scale production of NGPs, their work did spur globally increasing interest in nano graphene materials, mostly motivated by the thoughts that graphene could be useful for developing novel electronic devices.

(v) Zhamu and Jang [75] developed a very effective way of exfoliating/separating NGPs from natural graphite and other laminar graphitic materials by exposing the material (without any intercalation or oxidation) to an ultra-sonication treatment. This process may be considered as peeling off graphene layers at a rate of 20,000 layers per second (if the ultrasonic frequency is 20 kHz) or higher (if higher frequency). The resulting NGPs are pristine graphene without any intentionally added or bonded oxygen.

Approach 3: Epitaxial Growth and Chemical Vapor Deposition of Nano Graphene Sheets on Inorganic Crystal Surfaces (w) Small-scale production of ultra-thin graphene sheets on a substrate can be obtained by thermal decomposition-based epitaxial growth [53] and a laser desorption-ionization technique [54]. A scanning probe microscope was used by Roy et al. [55] and by Lu et al. [56] to manipulate graphene layers at the step edges of graphite and etched HOPG, respectively, with the goal of fabricating ultra-thin nano-structures. It was not clear if single graphene sheets were obtained using this technique by either group. Epitaxial films of graphite with only one or a few atomic layers are of technological and scientific significance due to their peculiar characteristics and great potential as a device substrate [57-63]. The graphene sheets produced are meant to be used for future nano-electronic applications, rather than composite reinforcements.

Approach 4: The Bottom-Up Approach (Synthesis of Graphene from Small Molecules)

(x) X. Yang, et al. [65] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

There are several major issues associated with the aforementioned processes:

(1) The GO nano platelets prepared by Approach 1, albeit dispersible in water and several other polar liquids such as ethanol and acetone, are not dispersible in a wide range of organic solvents.

(2) The GO nano platelets exhibit an electrical conductivity typically several orders of magnitude lower than the conductivity of pristine NGPs. Even after chemical reduction, the GO still exhibits a much lower conductivity than pristine NGPs. It appears that preparation of intercalated graphite, which involves the oxidizing agent such as nitric acid or potassium permanganate, typically and necessarily requires graphite to be heavily oxidized. Complete reduction of these highly oxidized graphite platelets hitherto has not been successfully attained.

(3) The GO nano platelets, after a high degree of chemical reduction, are able to recover some of the properties of pristine graphite, but are typically no longer dispersible in water and most of the organic solvents.

(4) The NGPs produced by Approach 2 and Approach 3 are normally pristine graphene and highly conducting. However, most of these processes either are not amenable to the large-scale manufacturing of NGPs or not suitable for the production of ultra-thin NGPs (<10 nm in thickness).

(5) Pristine NGPs, just like reduced GO platelets, are typically not soluble or dispersible in water or most of the organic solvents. It is also difficult to homogeneously mix or disperse pristine NGPs in a polymer matrix. These features make it difficult to fabricate nanocomposite parts with good filler dispersion or good filler-matrix interfacial bonding, which are essential to the realization of good composite properties.

Hence, it is an object of the present invention to provide a nano graphene platelet material that is soluble or dispersible in a range of organic solvents while maintaining good properties of pristine graphene (e.g., good electrical or thermal conductivity).

It is another object of the present invention to provide a processable nano graphene platelet material that can be dispersed in a range of polymer matrices to form nanocomposites of desirable properties (e.g., achieving good electrical, thermal, or mechanical properties).

REFERENCES CITED

1. Novoselov, K. S., et al. Electric field effect in atomically thin carbon films. *Science* 306, 666-669 (2004).
2. Novoselov, K. S., et al. Two dimensional atomic crystals. *Proc. Natl. Acad Sci.* 102, 10451-10453 (2005).
3. Jang, B. Z. & Huang, W. C. Nano-scaled grapheme plates. U.S. Pat. No. 7,071,258, (submitted on Oct. 21, 2002 and issued on Jul. 04, 2006).

4. Jang, B. Z. Process for nano-scaled graphene plates. U.S. patent application Ser. No.11/442,903 (Jun. 20, 2006); a divisional of Ser. No. 10/274,473 (Oct. 21, 2002).
5. McAllister, M. J., et al. Single sheet functionalized graphene by oxidation and thermal expansion of graphite. *Chem. Materials* 19(18), 4396-4404 (2007).
6. Li, J. L., et al. Oxygen-driven unzipping of graphitic materials. *Phys. Rev. Lett.* 96, 176101-1-4 (2006).
7. Schniepp, H. C., et al. Functionalized single graphene sheets derived from splitting graphite oxide. *J. Phys. Chem.* B110, 8535-8547 (2006).
8. Li, X., Wang, X., Zhang, L., Lee, S. & Dai, H., Chemically derived, ultrasmooth graphene nanoribbon semiconductor. *Science* 319, 1229-1232 (2008).
9. Bor Z. Jang and A Zhamu, "Processing of Nano Graphene Platelets (NGPs) and NGP Nanocomposites: A Review," J. Materials Sci. 43 (2008) 5092-5101.
10. Bunnell, Sr. L. R. Enhancement of the mechanical properties by graphite flake addition. U.S. Pat. No. 4,987,175 (Jan. 22, 1991).
11. Bunnell, Sr. L. R. Enhancement of mechanical properties of polymers by thin flake addition and apparatus for producing such thin flakes. U.S. Pat. No. 5,019,446 (May 28, 1991).
12. Bunnell, Sr. L. R. Method for producing thin graphite flakes with large aspect ratios. U.S. Pat. No. 5,186,919 (Feb. 16, 1993).
13. Zaleski, P. L., et al. Method for expanding lamellar forms of graphite and resultant product. U.S. Pat. No. 6,287,694 (Sep. 11, 2001).
14. Horiuchi, S., et al. Single graphene sheet detected in a carbon nanofilm. *Appl. Phys. Lett.* 84, 2403-2405 (2004); paper received on 8 Sep. 2003.
15. Horiuchi, S., et al. Carbon nano-film with a new structure and property. *Japan. J. Appl. Phys.* Part 2, 42, L1073-L1076 (2003).
16. Hirata, M. & Horiuchi, S. Thin-film-like particles having skeleton constructed by carbons and isolated films," U.S. Pat. No. 6,596,396 (Jul. 22, 2003).
17. Hirata, M. & Horiuchi, S. Composites containing thin-film particles having carbon skeleton, method of reducing the thin-film particles, and process for the production of the composite. U.S. Pat. No. 6,596,396 (Jul. 22, 2003).
18. Hirata, M., Gotou, T. & Ohba, M. Thin-film particles of graphite oxide, 2: preliminary studies for internal micro fabrication of single particle and carbonaceous electronic circuits. *Carbon* 43, 503-510 (2005).
19. Hirata, M., Gotou, T., Horiuchi, S., Fujiwara, M. & Ohba, M. Thin-film particles of graphite oxide, 1: high yield synthesis and flexibility of the particles. *Carbon* 42, 2929-2937 (2004).
20. Hummers, W. S. Preparation of graphitic acid. U.S. Pat. No. 2,798,878, Jul. 9, 1957.
21. Hummers, W. S. Preparation of graphitic oxide. *J. Am. Chem. Soc.* 80, 1339 (1958).
22. Liu, P. & Gong, K. Synthesis of polyaniline-intercalated graphite oxide by an in situ oxidative polymerization reaction. *Carbon* 37, 706-707 (1999).
23. Dekany, I., Kruger-Grasser, R. & Weiaa, A. Selective liquid sorption properties of hydrophobized graphite oxide nanostructures. *Colloid Polymer Sci.* 276, 570-576 (1998).
24. Chen, G. H. Preparation and characterization of graphite nanosheets from ultrasonic powdering technique. *Carbon* 42, 753-759 (2004).
25. Jang, B. Z., Wong, S. C. & Bai, Y. Process for producing nano-scaled graphene plates," U.S. patent application Ser. No. 10/858,814 (Jun. 3, 2004); Pub. No. US 2005/0271574 (Pub. Dec. 8, 2005).
26. Petrik, V. 1. Mass production of carbon nanostructures. U.S. patent application Ser. No. 11/007,614 (Dec. 7, 2004); Publ No. US 2006/0121279 (Pub. Jun. 8, 2006).
27. Drzal L. T. & Fukushima, H. Expanded graphite and products produced therefrom. U.S. patent application Ser. No. 11/363,336 (Feb. 27, 2006); Ser. No. 11/361,255 (Feb. 24, 2006); Ser. No. 10/659,577 (Sep. 10, 2003).
28. Matsuo, Y., Tahara, K. & Sugie, Y. Preparation and characterization of poly(vinyl alcohol)- and $Cu(OH)_2$-poly(vinyl alcohol)-intercalated graphite oxides. *Chem. Materials* 10, 2266-2269 (1998).
29. Xu, J. Y., et al. Thermal analysis of poly(vinyl alcohol)/graphite oxide intercalated polymer composites. *Polymer Degradation and Stability* 73, 29-31 (2001).
30. Xu, J. Y. Preparation and characterization of poly(vinyl alcohol)/graphite oxide nanocomposites. *Carbon* 40, 445-467 (2002).
31. Xu, J. Y., Hu, Y., Song, L., Wang, Q. G. & Fang, W. C. Preparation and characterization of polyacrylamide-intercalated graphite oxide. *Materials Research Bulletin* 36, 1833-1836 (2001).
32. Xu, J. Y. Structure of poly(acrylic acid)-intercalated graphite oxide. *Carbon* 40, 2961-2973 (2002).
33. Liu, P. G., Gong, K., Xiao, P. & Xiao, M. Preparation and characterization of poly(vinyl acetate)-intercalated graphite oxide nanocomposites. *J. Mater. Chem.* 10, 933-935 (2002).
34. Du, X. S., Xiao, M., Meng, Y. Z. & Hay, A. S. Direct synthesis of poly(arylene disulfide)/carbon nano-sheet composites via the oxidation with graphite oxide. *Carbon* 43, 195-213 (2005).
35. Xiao, P., Xiao, M., Liu, P. G. & Gong, K. Direct synthesis of a polyaniline-intercalated graphite oxide nanocomposites. *Carbon* 38, 626-628 (2000).
36. Hamwi, A. & Marchand, V. Some chemical and electrochemical properties of graphite oxide. *J. Phys. Chem. Solids* 57, 867-872 (1996).
37. Lerf, A., He, H. Y. & Forester, M. Structure of graphite oxide revisited. *J. Phys. Chem,* B. 102, 4477-4482 (1998).
38. Matsuo, Y., Tahara, K. & Sugie, Y. Synthesis of poly (ethylene oxide)-intercalated graphite oxide. *Carbon* 34, 672-674 (1996).
39. Kotov, N. A., Dekany, I. & Fendler, J. H. Ultrathin graphite oxide-polyelectrolyte composites prepared by self-assembly: transition between conductive and non-conductive states. Adv. Mater. 8, 637-641 (1996).
40. Matsuo, Y., Tahara, K. & Sugie, Y. Structure and thermal properties of poly(ethylene oxide)-intercalated graphite oxide. *Carbon* 35 (1), 113-120 (1997).
41. Cassagneau, T. & Fendler, J. H. High-density rechargeable lithium-ion batteries self-assemble from graphite oxide nanoplatelets and polyelectrolytes. *Adv. Materials* 10 (11), 877-881 (1998).
42. Cassagneau T., Guerin, F. & Fendler, J. H. Preparation and characterization of ultrathin films layer-by-layer self-assembled from graphite oxide nanoplatelets and polymers. *Langmuir* 16, 7318-7324 (2000).
43. Kovtyukhova, N. I. et al. Layer-by-layer assembly of ultrathin composite films from micron-sized graphite oxide sheets and polycations. *Chem. Mater.* 11, 771-778 (1999).

44. Szabo, T., Szeri, A. & Dekany, I. Composite graphitic nanolayers prepared by self-assembly between finely dispersed graphite oxide and a cationic polymer. Carbon 43, 87-94 (2005).
45. Stankovich, S. Stable aqueous dispersions of graphitic nanoplatelets via the reduction of exfoliated graphite oxide in the presence of poly(sodium 4-styrenesulfonate). *J. Mater. Chem.* 16, 155-158 (2006).
46. Stankovich, S., Piner, R. D., Nguyen, S. T. and Ruoff, R. S. Synthesis and exfoliation of isocyanate-treated graphene oxide nanoplatelets. *Carbon* 44, 3342-3347 (2006).
47. Li, D., Muller, M. C., Gilje, S., Kaner, R. B. & Wallace, G. Processable aqueous dispersions of graphene nanosheets. *Nature Nanotechnology* 3, 101-105 (2008).
48. Y. Si and E. T. Samulski, "Synthesis of Water Soluble Graphene," Nano Letters, 8 (6) (2008) 1679-1682.
49. Mazurkiewicz, M. Graphite platelet nanostructures. U.S. patent application Ser. No. 09/951,532,; Pub. No. US 2002/0054995 (Published on May 9, 2002).
50. Shioyama, H. Cleavage of graphite to graphene. *J. Mater. Sci. Lett.* 20, 499-500 (2001).
51. Mack, J. J. et al. Chemical manufacture of nanostructured materials. U.S. Pat. No. 6,872,330 (Mar. 29, 2005).
52. Viculis, L. M., Mack, J. J., & Kaner, R. B. A chemical route to carbon nanoscrolls. *Science*, 299, 1361 (2003).
53. Berger, C., et al. Ultrathin epitaxial graphite: two-dimensional electron gas properties and a route toward graphene-based nanoelectronics. *J. Phys. Chem. B* 108, 19912-19916 (2004).
54. Udy, J. D. Method of continuous, monoatomic thick structures. U.S. patent application Ser. No. 11/243,285 (Oct. 4, 2005); Pub No. 2006/0269740 (Nov. 30, 2006).
55. Roy, H. V., Kallinger, C., Marsen, B. & Sattler, K. Manipulation of graphitic sheets using a tunneling microscope. *J. Appl. Physics* 83, (9) 4695-4699 (1998).
56. Lu, X. K., Yu, M. F., Huang, H., & Ruoff, R. S. Tailoring graphite with the goal of achieving single sheets. *Nanotechnology* 10, 269-272 (1999).
57. Land, T. A., Michely, T., Behm, R. J., Hemminger, J. C. & Comsa, G. STM investigation of single layer graphite structures produced on Pt(111) by hydrocarbon decomposition. *Surf. Sci.* 264, 261-270 (1992).
58. Nagashima, A. et al. Electronic states of monolayer graphite formed on TiC (111) surface. *Surf. Sci.* 291, 93-98 (1993).
59. van Bommel, A. J., Crombeen, J. E. & van Tooren, A. LEED and Auger electron observations of the SiC(0001) surface. *Surf. Sci.* 48, 463-472 (1995).
60. Forbeaux, I., Themlin, J.-M. & Debever, J. M. Heteroepitaxial graphite on 6H—SiC(0001): Interface formation through conduction-band electronic structure. *Phys. Rev. B* 58, 16396-16406 (1998).
61. Oshima, C. & Nagashima, A. Ultra-thin epitaxial films of graphite and hexagonal boron," *J. Condensed Matter*, 9, 1-20 (1997).
62. Wu, Y. & Chong, C. Two-dimensional nano-sized structures and apparatus and methods for their preparation. U.S. patent application Ser. No. 10/124,188 (US Pub. No. 2003/0129305, Jul. 10, 2003).
63. M. Zhu, J. Wang, R. A. Outlaw, K. Hou, D. M. Manos, and B. C. Holloway, Diamond Relat. Mater. 16, 196 (2007).
64. B. L. French, J. J. Wang, M. Y. Zhu, and B. C. Holloway, Thin Solid Films, 494, 105 (2006).
65. X. Yang, X. Dou, A. Rouhanipour, L. Zhi, H. J. Raider, and K. Mullen, "Tow-dimensional Graphene Nano-ribbons," J. Am. Chem. Soc. 130 (2008) 4216-17.
66. Prud'Homme, R. K., Aksay, I. A., Adamson, D. & Abdala, A. Thermally exfoliated graphite oxide. U.S. patent application Ser. No. 11/249,404 (Oct. 14, 2005); Pub No. US 2007/0092432 (Apr. 26, 2007).
67. H. A. Becerril, J. Mao, Z. Liu, R. M. Stoltenberg, Z. Bao, and Y. Chen, "Evaluation of Solution-Processed Reduced Graphene Oxide Films as Transparent Conductors," ACS Nano, 2 (2008) 463-470.
68. X. Wang, L. Zhi, and K. Muellen, "Transparent, Conductive Graphene Electrodes for Dye-Sensitized Solar Cells," Nano Letters, 8 (2008) 323-327.
69. Stankovich, S., et al. "Graphene-based composite materials," *Nature Letters*, 442, 282-286 (2006).
70. Sandip Niyogi, Elena Bekyarova, Mikhail E. Itkis, Jared L. McWilliams, Mark A. Hamon, and Robert C. Haddon, "Solution Properties of Graphite and Graphene, *J. Am. Chem. Soc.*, 128 (24) (2006) 7720-7721.
71. Worsley, K. A.; Ramesh, P.; Mandal, S. K.; Niyogi, S.; Itkis, M. E.; Haddon, R. C. "Soluble Graphene Derived from Graphite Fluoride," *Chem. Phys. Lett.*, 445 (1-3) (2007) 51-56.
72. Li, J., Kim, J. K. & Sham, M. L. Conductive graphite nanoplatelet/epoxy nanocomposites: effects of exfoliation and UV/Ozone treatment of graphite. *Scripta Materialia* 53, 235-240 (2005).
73. Dikin, D. A. Preparation and characterization of graphene oxide paper. *Nature Letters* 448, 457-460 (2007).
74. Geim, A. K. & Novoselov, K. S. The rise of grapheme. *Nature Materials* 6, 183-191 (2007).
75. Aruna Zhamu, Jinjun Shi, Jiusheng Guo and Bor Z. Jang, "Method of Producing Exfoliated Graphite, Flexible Graphite, and Nano-Scaled Graphene Plates," US Pat. Pending, Ser. No. 11/800,728 (05/08/2007).

SUMMARY OF THE INVENTION

The present invention provides a process for producing dispersible nano graphene platelet (NGP) materials that are highly conducting without having to go through a chemical reduction procedure. The electrical conductivity of NGPs in the present context was measured after the NGPs were formed into a thin film or paper or incorporated in a matrix material to form a nanocomposite.

The process comprises: (a) preparing a graphite intercalation compound (GIC) or graphite oxide (GO) from a laminar graphite material; (b) exposing the GIC or GO to a first temperature for a first period of time to obtain exfoliated graphite; and (c) exposing the exfoliated graphite to a second temperature in a protective atmosphere for a second period of time to obtain the desired dispersible nano graphene platelet with an oxygen content no greater than 25% by weight, preferably below 20% by weight, further preferably between 5% and 20% by weight. It may be noted that the "exfoliated graphite" after step (b) typically has an oxygen content of greater than 25% by weight, based on chemical elemental analysis and/or X-ray photoelectron spectroscopy (XPS). Hence, the "exfoliated graphite" at this stage comprises primarily graphite oxide (GO).

For the purpose of facilitating discussion, we may define those graphite platelets having an oxygen content higher than 15% by weight as GO nano platelets and those lower than approximately 15% as nano graphene. The pristine nano graphene refers to those NGPs that have an oxygen content less than 1% by weight. Hence, we have GO (>15% by wt. O), nano graphene ($\leqq$15% by wt. O), and pristine nano graphene ($\leqq$1% by wt. O).

Preferably, the protective atmosphere comprises an inert gas (e.g., argon), nitrogen, hydrogen, a combination of nitrogen and/or hydrogen with an inert gas, or vacuum. The first temperature, hereinafter also referred to as an exfoliation temperature, is preferably between approximately 200° C. and 1,500° C., more preferably between approximately 800° C. and 1,300° C., and further preferably at least 1,000° C. In one preferred embodiment, the second temperature is at least 1,000° C. and the second period of time is at least 10 minutes. The second temperature is hereinafter also referred to as a de-oxygenation temperature. In another preferred embodiment, the second temperature is at least 1,100° C. and the second period of time is at least 5 minutes. In still another preferred embodiment, the second temperature is at least 1,200° C. and the second period of time is at least 2 minutes.

The NGP prepared with this process, when formed directly into a thin film with a thickness no greater than 100 nm, typically exhibits an electrical conductivity of at least 100 S/cm. No post-process chemical reduction is needed, as opposed to most of the prior art processes where chemical reduction, using an undesirable reducing agent such as hydrazine, is required. In many cases, the NGP thin film exhibits an electrical conductivity of at least 10 S/cm, often greater than 100 S/cm, and, in some cases, greater than 600 S/cm.

The laminar graphite material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), graphitized soft carbon, hard carbon, and combinations thereof. MCMBs or CMS are usually obtained from a petroleum heavy oil or pitch, coal tar pitch, or polynuclear hydrocarbon material (highly aromatic molecules). When such a precursor pitch material is carbonized by heat treatment at 400° to 550°, micro-crystals called mesophase micro-spheres are formed in a non-crystalline pitch matrix. These mesophase micro-spheres, after being isolated from the pitch matrix (which is typically soluble in selected solvents), are often referred to as meso-carbon micro-beads (MCMB). The MCMBs commercially available are those that have been subjected to a further heat treatment at a temperature in the range of 2,000° C. and 3,000° C.

In many cases, the NGP has a specific surface area in the range of approximately 300 $m^2/g$ to 2,600 $m^2/g$. The NGPs obtained with the presently invented process tend to contain a significant proportion of single-layer graphene (with a thickness of 0.34-0.4 nm) or graphene of few layers (<2 nm) provided the laminar graphite material is heavily oxidized during the intercalation or oxidation step. The step of preparing a graphite intercalation compound (GIC) or graphite oxide (GO) comprises subjecting the laminar graphite material to an acid and/or an oxidizer selected from sulfuric acid, nitric acid, carboxylic acid, sodium or potassium nitrate, $KMnO_4$, sodium or potassium chlorate, hydrogen peroxide ($H_2O_2$), or a combination thereof.

The resulting NGPs prepared according to the presently invented process, although having a minimal amount of oxygen-containing groups, remain soluble or dispersible in water and several other organic solvents, such as methanol, ethanol, acetone, NMP, and toluene. These NGPs can be further functionalized by carrying out an additional step of contacting the NGP obtained in step (c) with a reactant such that a functional group is added to a surface or edge of the nano graphene platelet, wherein the functional group is selected from alkyl or aryl silane, alkyl or aralkyl group, hydroxyl group, amine group, fluorocarbon, or a combination thereof.

As indicated earlier, for practical purposes (e.g., for the purpose of facilitating discussion), the nano GO platelets that contain less than approximately 15% by weight of oxygen (hence, the electrical conductivity of a thin film made from these platelets is typically greater than 10 S/cm) are considered nano graphene platelets (NGPs).

The presently invented process is superior to many prior art processes (e.g., those belonging to the aforementioned Approach 1) in several aspects:

(1) For instance, as discussed earlier, Aksay, McAllister, and co-workers [Refs. 7-9, 66] used thermal exfoliation of GO to obtain exfoliated graphite oxide platelets, which were found to contain a high proportion of single-layer graphene oxide sheets. The process involved essentially an exfoliation step (e.g., at 1,050° C. for 30 seconds or in a propane torch for less than 15 seconds). Such a heat exposure, typically done in an un-protected environment containing oxygen, produces graphite oxide platelets (rather than nano graphene) that, albeit dispersible, are typically not electrically conducting. Furthermore, this prior art process did not have a good control over the oxygen content of the resulting GO platelets.

(2) In another commonly used prior art approach, as practiced by Stankovich et al. [45] and Hirata et al. [17-19], graphite was heavily oxidized to obtain graphite oxide, which was then mixed with water. The resulting suspension was then subjected to ultrasonication for an extended period of time to produce colloidal dispersions of GO platelets. The graphite oxide dispersion was then reduced with hydrazine, in the presence of poly (sodium 4-styrenesulfonate). This process led to the formation of a stable aqueous dispersion of polymer-coated graphene platelets. In some applications, a polymer coating may be undesirable (pure graphene being preferred). Furthermore, the reducing agent, hydrazine, is a toxic substance.

(3) Stankovich et al. [46] further developed a method to produce less hydrophilic GO platelets using an isocyanate treatment. However, unless stabilized by selected polymers, the chemically modified graphene sheets obtained through these methods tend to precipitate as irreversible agglomerates due to their hydrophobic nature. The resulting agglomerates became insoluble in water and organic solvents. By contrast, the presently invented process provides a convenient approach to the preparation of soluble or dispersible nano graphene that, in most cases, requires no further chemical reduction.

(4) Becerril, et al [67] and Wang, et al. [68] independently developed a very similar process for producing transparent, yet conducting electrode. The electrode was made by following a very tedious process that involves oxidation of natural graphite to form GO, repeated washing, ultrasonication, and 15 cycles of impurity removal steps that include centrifugation, discarding supernatant liquid, and re-suspending the solid in an aqueous mixture of sulfuric acid and hydrogen peroxide [67]. The suspension was eventually spin-coated on a solid substrate to form a GO thin film, which was then partially reduced by heating the film in a high vacuum at a high temperature for a long period of time. Such a long process does not appear to be amenable to mass production of conducting nano graphene platelets. It may be noted that both Becerril, et al [67] and Wang, et al. [8], did subject the GO films to a high temperature treatment after the tedious solution process for producing GO nano sheets and obtained electrical conductivity as high as 550 S/cm. However, once such a high temperature treatment was done, the GO nano sheets were no longer dispersible in water.

(5) In the presently invented process, step (b) and (c) can be conducted sequentially or concurrently using the same reactor. The exfoliated graphite may be allowed to stay in the exfoliation reactor (e.g., a quartz tube), obviating the need to transfer it to another reactor.

(6) Another unexpected benefit of the presently invented process is the observation that most of the impurities, including those used originally for intercalation/oxidation of graphite, appear to be burnt out or decomposed during the initial exfoliation procedure and, particularly, the de-oxygenation procedure (at higher temperatures), obviating a need for washing and rinsing the GO platelets (as is required in the cases of prior art solution approach to the exfoliation of GO and/or subsequent chemical reduction).

DETAILED DESCRIPTION OF PREFERRED EMBODIMENTS

Figure 1:
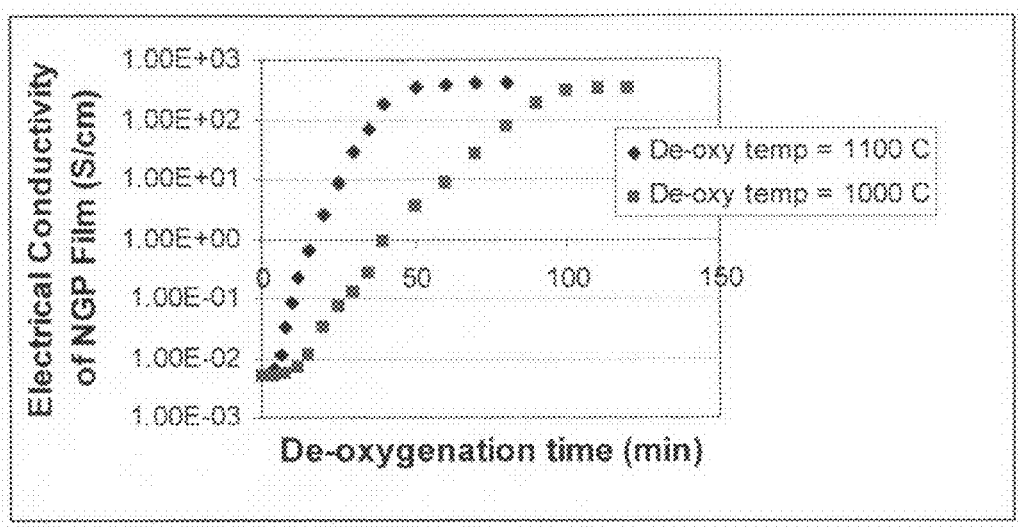
FIG. 1 Electrical conductivity data of the thin films made from GO nano platelets after various periods of de-oxygenation time at 1,000° C. and 1,100° C., respectively.

Intercalation or Oxidation of Graphite: In most of the prior art methods for making separated nano graphene platelets, the process begins with intercalating lamellar graphite flake particles with an expandable intercalation agent (also known as an intercalant or intercalate) to form a graphite intercalation compound (GIC), typically using a chemical oxidation or an electrochemical (or electrolytic) method. The GIC is characterized as having intercalant species, such as sulfuric acid and nitric acid, residing in interlayer spaces, also referred to as interstitial galleries or interstices. In traditional GICs, the intercalant species may form a complete or partial layer in an interlayer space or gallery. If there always exists one graphene layer between two intercalant layers, the resulting graphite is referred to as a Stage-1 GIC. If n graphene layers exist between two intercalant layers, we have a Stage-n GIC.

It may be noted that intercalation of graphite (e.g., if intercalated by potassium melt) does not necessarily lead to oxidation of graphite. However, if the intercalant contains an acid (e.g., sulfuric acid, nitric acid, carboxylic acid, etc.) and/or an oxidizing agent (e.g., $KMnO_4$, sodium or potassium chlorate, and hydrogen peroxide, $H_2O_2$), the resulting GIC is essentially a graphite oxide (GO) material. This is true of essentially all of the known prior art chemical processes for the preparation of GO nano platelets.

Exfoliation: This intercalation or oxidation step is followed by rapidly exposing the GIC or GO material to a high temperature, typically between 800 and 1,100° C., to exfoliate the graphite material, forming vermicular graphite structures known as graphite worms. It is important to understand that these graphite worms or their constituent graphite flakes are actually graphite oxide, not graphene. They typically contain more than 30% by weight of oxygen, existing as oxygen-containing functional groups like carboxyl or hydroxyl on both the basal plane surfaces and edges of graphene layers. Exfoliation is believed to be caused by the interlayer volatile gases, created by the thermal decomposition, phase transition, or chemical reaction of the intercalant, which induce high gas pressures inside the interstices that push apart neighboring layers. In some methods, the exfoliation product is graphite worms that contain more or less interconnected graphite oxide flakes or functional group-decorated graphene sheets that are still more or less clustered or tied together. In order to further separate these interconnected graphite oxide flakes, the exfoliation product may then be subjected to air milling, air jet milling, ball milling, or ultrasonication before or after the second heat treatment.

In one preferred embodiment of the present invention, a dispersible NGP-producing process begins with the preparation of a GIC or GO material, followed by heating the GIC or GO material to obtain exfoliated graphite. These two steps are similar to the above-described two steps—intercalation/oxidation of graphite and exfoliation of GIC/GO. Although exfoliation temperature is typically between 800 and 1,100° C. for the GIC or GO prepared from natural graphite, we have found that the GIC or GO prepared from meso-phase carbon microbeads (MCMB) can be effectively exfoliated at a temperature as low as 200° C. However, in all cases, higher exfoliation temperatures are preferred and exfoliation is preferably conducted in a protective atmosphere (e.g., containing an inert gas, hydrogen, and/or nitrogen). It is of significance to note that, in the prior art, for all purposes (e.g., to produce graphite worms, flexible graphite, graphite oxide flakes, or separated graphene oxide sheets), exfoliation of the GIC/GO was prescribed to occur at a relatively high temperature for a very short period of time, typically shorter than 2 minutes, more typically shorter than 1 minute, and often shorter than 30 seconds. In the prior art, expansion or exfoliation of graphite oxide was normally completed within this short period of time and, hence, continued heating of the freshly exfoliated graphite was believed to be unnecessary and undesirable (for fear of thermally degrading the exfoliation product or perhaps for the purpose of saving energy).

Contrary to this conventional wisdom, we have surprisingly observed that a further exposure of the exfoliated graphite product to a high temperature (typically higher than the exfoliation temperature), but in a protective atmosphere, could de-oxygenate or reduce the graphite oxide platelets to a range of very unique and useful oxygen contents. Within this range, exfoliated graphite oxide platelets become highly electrically conducting and yet remain soluble or dispersible in water and many other organic solvents. In the prior art, dispersibility and conductivity are generally believed to be non-coexisting. This good solubility or dispersibility enables the production of NGP-based products, such as graphene paper, film, and nanocomposite structures, that have desirable physical properties. No subsequent chemical reduction of the platelets is required.

Although partial de-oxygenation of the exfoliated graphite oxide flakes was suggested by others [e.g., 67,68] as a means of reducing the product to recover electrical properties of nano graphene after the product is made (e.g., after graphene oxide thin film or paper is produced), the prior art tasks [67,68] were based on chemical solution-based GO exfoliation, not thermal exfoliation. However, once the de-oxygenation treatment in a vacuum was done, the graphene platelets were no longer soluble or dispersible. The prior art has not taught about the approach of continuing heating or re-heating the thermally exfoliated GO products in a protective atmosphere to obtain dispersible yet conductive NGPs. Furthermore, the prior art has not suggested that this continual heating or re-heating could be preferably conducted immediately after, or concurrently with the exfoliation step to save energy and time. In the presently invented process, further preferably, these two operations (thermal exfoliation and de-oxygenation) are conducted using the same reactor. It has been hitherto commonly believed by those skilled in the art that chemical processibility and electrical conductivity of graphite materials are mutually exclusive. Quite opposite to this common wisdom, we have herein proven that, within a reasonable range of oxygen contents in GO nano platelets and their associated window of processing conditions, these two features can be achieved at the same time.

Thus, the present invention provides an NGP-producing process that comprises: (a) preparing a graphite intercalation compound (GIC) or graphite oxide (GO) from a laminar graphite material; (b) exposing the GIC or GO to a first temperature for a first period of time to obtain exfoliated graphite; and (c) exposing the exfoliated graphite to a second temperature in a protective atmosphere for a second period of time to obtain the desired dispersible nano graphene platelet with an oxygen content no greater than 25% by weight, preferably below 20% by weight, further preferably between 5% and 20% by weight. The resulting NGPs are both dispersible and conductive, which were generally believed to be mutually exclusive features of graphene or graphene oxide.

The laminar graphite materials used in the prior art processes for the production of the GIC, GO, and subsequently made exfoliated graphite, flexible graphite sheets, and graphene platelets were, in most cases, natural graphite. However, the present invention is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous solid materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

The relatively weak van der Waals forces leave all of these laminar graphite materials vulnerable to penetration of intercalants or chemical attack by a range of chemical species, such as concentrated acids and oxidizing agents (e.g., hydrogen peroxide). It is now well-known that one way to produce ultra-thin GO platelets is through strong oxidation of natural graphite, as proposed by several researchers [Refs. 5-8, 14-19, 65-70]. The oxidation of graphite is preferably to the extent that no diffraction peaks corresponding to the well-known interplanar spacing (0.335 nm) of graphite are observed and that strong peaks corresponding to expanded interlaminar spacing (typically slightly >6 nm) of graphite oxide appear. However, none of these researchers have attempted to produce GO nano platelets or NGPs from other types of laminar graphite materials than natural graphite. None of them have suggested a second exposure of the exfoliated graphite materials to a high temperature, protective atmosphere after first heat exposure for graphite exfoliation.

The step of intercalating may comprise chemical intercalating or electrochemical intercalating using an intercalate selected from an acid, an oxidizing agent, or a mixture of an acid and an oxidizing agent. Most commonly used acids are sulfuric acid and nitric acid and most commonly used oxidizers are nitric acid, hydrogen peroxide, sodium nitrate, sodium perchlorate, and potassium permanganate. An environmentally benign intercalate, such as acetic acid, formic acid, or a carboxylic acid, is preferred. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. The electrochemical intercalating may comprise using a carboxylic acid as both an electrolyte and an intercalate source. The electrochemical intercalating may comprise imposing an electric current, at a current density in the range of 50 to 600 $A/m^2$, to the MCMBs or carbon fiber segments (as two examples), which are used as an electrode material.

The step of exfoliating intercalated or oxidized graphite materials comprises exposing the GIC or GO to a temperature preferably in the range of 250° C. to 1,100° C., more preferably between 650° C. and 1,100° C., and most preferably greater than 850° C. This exfoliation temperature is herein referred to as the first temperature. The exfoliation time is typically between 15 seconds and 2 minutes. Although the second exposure temperature (for the purpose of de-oxygenation) can be the same as the first exposure temperature, the second or de-oxygenation temperature is preferably higher than the first or exfoliation temperature. The de-oxygenation temperature is preferably higher than 900° C., more preferably higher than 1,000° C., and most preferably between 1,100° C. and 1,500° C. This upper limit of 1,500° C. is suggested on the basis of convenience in operation since most of the furnaces have a rated temperature up to 1,500° C. and it would be more challenging to work with associated sealing components to achieve a protective environment (e.g., argon gas or vacuum) if the operating temperature exceeds 1,500° C. The de-oxygenation time is typically between 1 minute and 2 hours.

After an extensive research effort, we have found that thermal exfoliation and de-oxygenation procedures are preferably conducted in such a manner that the oxygen content of the resulting nano graphene or GO platelets is below 25% by weight, further preferably below 20% by weight, and most preferably between approximately 5% and 20% by weight. With a proper oxygen content, the nano platelets remain soluble or dispersible in a wide array of solvents, yet exhibiting high electrical conductivity. With an oxygen content of below 5% by weight, solubility becomes relatively limited although the NGPs become more conductive.

The protective atmosphere can be a vacuum or a gas atmosphere containing an inert gas (such as argon), nitrogen, hydrogen, or a combination thereof. It is particularly useful to add approximately 3% of hydrogen in nitrogen for the de-oxygenation atmosphere since hydrogen seems to assist in the de-oxygenation or reduction process of graphite oxide. Hydrogen also seems to provide useful functional groups, such as carboxyl and hydroxyl.

The following examples serve to provide the best modes of practice for the present invention and should not be construed as limiting the scope of the invention:

EXAMPLE 1

NGPs from Carbon/Graphite Fibers

Continuous graphite fiber yarns (Magnamite from Hercules) were cut into segments of 5 mm long and then ball-milled for 24 hours. Approximately 20 grams of these milled fibers were immersed in a mixture of 2 L of formic acid and 0.1 L of hydrogen peroxide at 45° C. for 48 hours. Following the chemical oxidation intercalation treatment, the resulting intercalated fibers were washed with water and dried. The resulting product is a formic acid-intercalated graphite fiber material containing graphite oxide crystallites.

Subsequently, approximately ½ of the intercalated or oxidized fiber sample was transferred to a furnace pre-set at a temperature of 600° C. for 30 seconds. The compound was found to induce extremely rapid and high expansions of graphite crystallites. The as-exfoliated graphite fiber is designated as Sample-1a. Approximately half of Sample 1-a material was subjected to de-oxygenation at 1,100° C. for 20 minutes in a nitrogen atmosphere to obtain Sample-1b.

A small amount of both materials was mixed with an aqueous ethanol solution to form two separate suspensions, which were subjected to further separation of exfoliated flakes using a Cowles shearing device. Both graphite oxide platelets (Sample 1-a) and reduced GO platelets (essentially NGPs) were found to be soluble and well-dispersed in this aqueous solution. The resulting suspensions were dip-coated to form thin films with a thickness of approximately 100 nm on glass slide surfaces. The thickness of individual platelets was found to range from two graphene sheets to approximately 25 graphene sheets (average of 14 sheets or approximately 4.7 nm) based on SEM and TEM observations. The length of these NGPs was typically in the range of 10-60 μm and width in the range of 0.5-2 μm.

A four-point probe method was used to measure the electrical conductivity of the thin films on the glass substrate. It was found that the conductivity of the film prepared from Sample 1-a (as-exfoliated GO platelets) was approximately $1.3 \times 10^{-3}$ S/cm while that of Sample 1-b was 2.8 S/cm.

EXAMPLE 2

NGPs from Sulfuric Acid Intercalation and Exfoliation/De-Oxygenation of MCMBs MCMB 2528 microbeads were supplied by Alumina Trading, which is the U.S. distributor for the supplier, Osaka Gas Chemical Company of Japan. This material has a density of about 2.24 g/cm$^3$; a particle size maximum for at least 95% by weight of the particles of 37 microns; median size of about 22.5 microns and an inter-planar distance of about 0.336 nm. MCMB 2528 (10 grams) were intercalated with an acid solution (sulfuric acid, nitric acid, and potassium permanganate at a ratio of 4:1:0.05) for 24 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The dried powder sample was placed in a quartz tube and inserted into a horizontal tube furnace pre-set at a desired temperature, 600° C. for 30 seconds to obtain Sample 2-a. Approximately one half of the exfoliated MCMB sample was subjected to de-oxygenation treatment at 1,250° C. for 15 minutes in an argon environment to obtain Sample 2-b. A small quantity of each sample was mixed with water and ultrasonicated at a 60 W power for 10 minutes to obtain a suspension. Again, thin films were prepared from each suspension by dip coating and the electrical conductivity of the films was measured. The conductivity of the film prepared from Sample 2-a (as-exfoliated oxidized MCMB platelets) was found to be approximately $1.8 \times 10^{-2}$ S/cm and that of Sample 2-b after de-oxygenation was 67 S/cm. Both types of platelets were well-dispersed in water.

EXAMPLE 3

Oxidation, Exfoliation, and De-Oxygenation of Natural Graphite

Graphite oxide was prepared by oxidation of graphite flakes with sulfuric acid, sodium nitrate, and potassium permanganate at a ratio of 4:1:0.05 at 30° C. for 24 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å), indicating that graphite has been converted into graphite oxide.

The dried, intercalated (oxidized) compound was divided into two batches, both for exfoliation at 800° C. for 1 minute by placing the sample in a quartz tube that was inserted into a horizontal tube furnace pre-set at 800° C. For Sample 3-a, exfoliation was followed by de-oxygenation at 1,000° C. for various periods of time, from 1 minute to 120 minutes. For Sample 3-b, the de-oxygenation temperature was 1,100° C., from 1 minute to 80 minutes. The de-oxygenation atmosphere was approximately 95% nitrogen and 5% hydrogen.

Two series of thin films were prepared from these two samples for the purpose of measuring the electrical conductivity of the GO nano platelets or NGPs as a function of the de-oxygenation time and the resulting oxygen content. The oxygen content, based on the elemental analysis, was for those oxygen atoms in functional groups attached to the plane surfaces and edges of the platelets. The exfoliated and de-oxygenated products, after various periods of de-oxygenation, were each mixed with water and then subjected to a mechanical shearing treatment using a Cowles rotating-blade shearing machine for 20 minutes. The resulting platelets were found to have an average thickness of 6.3 nm. Spin coating was used to prepare thin films for conductivity measurement. GO or graphene platelets at selected de-oxygenation time intervals were also analyzed for their oxygen contents using X-ray photoelectron spectroscopy (XPS) available at the Center for Multifunctional Nonmaterial at Wright State University, Dayton, Ohio.

Shown in FIG. 1 is a summary of the electrical conductivity data of the films made from GO nano platelets after various periods of de-oxygenation time at 1,000° C. and 1,100° C., respectively. The conductivity of the film varies from $5.0 \times 10^{-3}$ S/cm of as-foliated GO to 180 S/cm after 40 minutes of de-oxygenation, and to $4.1 \times 10^2$ S/cm after 80 minutes, the latter representing a five order-of-magnitude improvement in electrical conductivity. The GO or de-oxygenated GO platelets were found to be soluble or dispersible in water up to an oxygen content of 5.6% by weight (after 50 minutes at 1,100° C., giving rise to an electrical conductivity of 360 S/cm). This conductivity value is a very impressive result, comparable to the best achievable conductivity with strong or heavy chemical reduction and/or vacuum de-oxygenation treatments after the films were made (yet those graphene platelets of the thin films prepared in the prior art became non-dispersible) [Refs. 47,67,68].

The two curves and the observations made on the solution dispersibility of the corresponding suspensions appear to indicate that the conductivity increases rapidly with the degree of de-oxygenation while the GO platelets remain soluble over a range of treatment time durations at a given de-oxygenation temperature; e.g., up to 50 minutes at 1,100° C. Once the conductivity value reaches a plateau, the platelets begin to lose their solubility or dispersibility in water and other polar solvents, such as ethanol and acetone. Fortunately, this plateau value is already very high, typically in the range of 100-1,000 S/cm.

Figure 2:
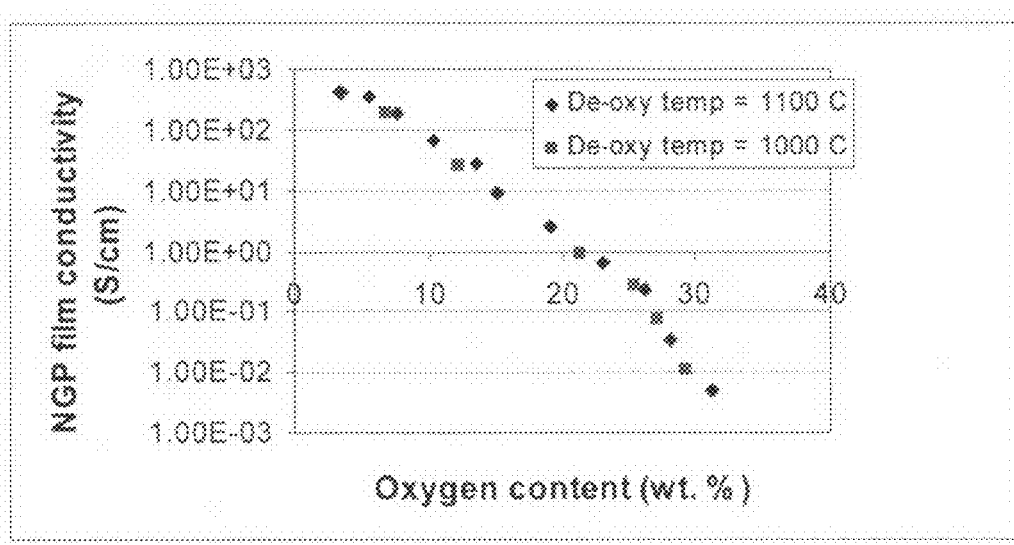
FIG. 2 Electrical conductivity data plotted as a function of the corresponding oxygen content for two de-oxygenation temperatures.

The electrical conductivity data were plotted as a function of the corresponding oxygen content data for two de-oxygenation temperatures, as shown in FIG. 2. It is clear that, regardless of the de-oxygenation temperature, it is the final oxygen content that governs the conductivity of GO or reduced GO platelets; the lower the oxygen content, the higher the conductivity is. When the oxygen content is below 5% by weight, the reduced GO tends to become insoluble or non-dispersible in water. Surprisingly, and fortunately, within the oxygen content range of 5%-20%, the nano platelet film exhibits a conductivity value greater than 1 S/cm. If the oxygen content is below 15%, the conductivity is greater than 10 S/cm. The conductivity of the NGP film is greater than 100 S/cm if the oxygen content is below 10%.

EXAMPLE 4

Figure 3:
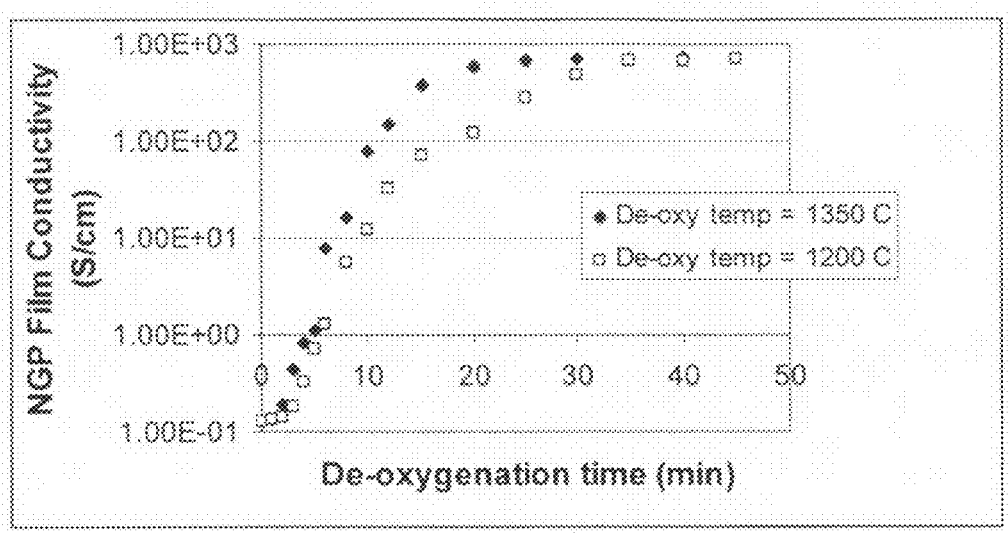
FIG. 3 Electrical conductivity data of GO nano platelet films after various periods of platelet de-oxygenation time at 1,200° C. and 1,350° C.

Oxidation, Exfoliation, De-Oxygenation, and Further Functionalization of Natural Graphite The samples of Example 4, including Sample 4-a and 4-b, were prepared in a similar manner as described in Example 3, but the exfoliation was conducted at 1,000° C. for 45 seconds, followed by de-oxygenation at 1,200° C. and 1,350° C., respectively, for various periods of time. Shown in FIG. 3 is a summary of the electrical conductivity data of the films made from GO nano platelets after various periods of de-oxygenation time. These data further confirm the trend observed earlier that the electrical conductivity of nano graphene or graphene oxide films increases with increasing de-oxygenation time (or decreasing oxygen content). High conductivity can be attained with shorter periods of time if the de-oxygenation temperature is sufficiently high.

In order to determine if a lower oxygen content would adversely affect the functionalization capability of graphene platelets and how functionalization would impact the electrical conductivity of these platelets, we carried out additional work on selected samples, described below: With the de-oxygenation atmosphere containing some hydrogen, we presumed that the edges of graphene or graphene oxide platelets contained a significant amount of activated C—H bonds. We chose to sulfonate the two samples that had been de-oxygenated for 10 minutes and 45 minutes, respectively, at 1,200° C. The sample with a 10-min de-oxygenation treatment (Sample 4-a-10) was highly soluble in water, but that with a 45-minute treatment (Sample 4-a-45) has poor or limited solubility in water. Sulfonation was conducted by subjecting the two samples to the vapor phase of a fuming sulfuric acid (oleum) containing 20% $SO_3$ for one hour. The results were very surprising. After the sulfonation treatment, Sample 4-a-10 remained highly soluble in water and Sample 4-a-45, originally having limited solubility, became soluble in water. Most surprisingly, the electrical conductivity of their respective films remained essentially un-changed, 12 S/cm and 695 S/cm, respectively. This important observation suggests that further functionalization of de-oxygenated graphene platelets provides another tool of varying solubility of the graphene platelets, as prepared by the presently invented de-oxygenation process, without adversely affecting their conductivity.

Sulfonation is but one of many approaches to the functionalization of de-oxygenated GO platelets. Presumably, both the functional groups attached to basal plane atoms and those at the edges of basal planes (or graphene planes) tend to decrease the electrical conductivity of a graphene or graphene oxide platelet. The surface functional groups are in the way of electron conduction paths and, hence, are much more influential on the electron transport. These groups represent defects that could significantly reduce the mean free path of electrons moving on a basal plane. The functional groups at the graphene edge, although altering the quantum wave functions of electrons at the edge, would have less significant effect on the overall conductivity. However, the presence of different functional groups could have significantly different effects on solubility or dispersibility of a graphene or graphene oxide platelet in a solvent and the interfacial bonding between a platelet and a matrix material in a nanocomposite. This implies that we now have a tool of adjusting the solubility or dispersibility of NGPs in a solvent without significantly varying the electrical conductivity.

EXAMPLE 5

Various Surface Functionalization Treatments of Partially De-Oxygenated NGPs

The partially de-oxygenated NGPs prepared according to a preferred embodiment of the present invention can be further functionalized by carrying out an additional step of contacting the NGP obtained in step (c) with a reactant such that a functional group is added to a surface or edge of the nano graphene platelet. The functional group may be selected from, as examples, alkyl or aryl silane, alkyl or aralkyl group, hydroxyl group, amine group, fluorocarbon, or a combination thereof.

Both Sample 4-a-10 and Sample 4-a-45 were subjected various functionalization treatments, briefly described as follows:

The graphite oxide platelets or NGPs, after a partial de-oxygenation treatment, will have a reactive graphene surface (RGS) or reactive graphene edge (RGE). They were subjected to the following reactions:
(a) RGS/RGE+$CH_2$=CHCOX (at 1,000° C.)→Graphene-R'COH (where X=—OH, —Cl, —$NH_2$, or —H); e.g., RGS/RGE+$CH_2$=CHCOOH→G-R'CO—OH (where G=graphene);
(b) RGS/RGE+Maleic anhydride→G-R'$(COOH)_2$;
(c) RGS/RGE+Cyonogen→G-CN;
(d) RGS/RGE+$CH_2$=CH—$CH_2$X→G-R'$CH_2$X (where X=—OH, -halogen, or —$NH_2$);
(e) RGS/RGE+$H_2O$→G=O (Quinoidal);
(f) RGS/RGE+$CH_2$=CHCHO→G-R'CHO (Aldehydic);
(g) RGS/RGE+$CH_2$=CH—CN→G-R'CN;
In the above-listed reactions, R' is a hydrocarbon radical (alkyl, cycloalkyl, etc).

The results of electrical conductivity measurements of the NGP films and observations on solubility of NGPs in solvents are summarized in Table 1. These data further confirm that chemical functionalization treatments can be used to vary the solubility or dispersibility of NGPs without significantly compromising electrical conductivity.

TABLE 1

Conductivity and solubility of functionalized NGPs.

| Sample | Functionalization Treatment | Thin Film Electrical Conductivity (S/cm) | Solubility in a Solvent |
|---|---|---|---|
| Sample 4-1-10 | None | 10 | Highly soluble in water, acetone, ethanol, etc. |
| Sample 4-1-45 | None | 695 | Limited solubility in water, acetone, ethanol |
| Sample 4-1-45 | Reaction (a), X = —OH | 688 | Became soluble in water and ethanol |
| Sample 4-1-45 | Reaction (b) | 683 | Became soluble in water and ethanol |
| Sample 4-1-10 | Reaction (c) | 10 | Highly soluble in water, acetone, ethanol, etc. |
| Sample 4-1-45 | Reaction (d), X = —$NH_2$ | 685 | Became soluble in acetone |
| Sample 4-1-10 | Reaction (e) | 11 | Highly soluble in water, acetone, ethanol, etc. |
| Sample 4-1-10 | Reaction (e) | 10 | Highly soluble in water, acetone, ethanol, etc. |
| Sample 4-1-10 | Reaction (f) | 9.5 | Highly soluble in water, acetone, ethanol, etc. |

EXAMPLE 6

Functionalization or Derivatization of NGPs Prepared by Partially De-Oxygenating GO Platelets Partial de-oxygenation of heavily oxidized GO can lead to the attachment of some functional groups on a surface or at an edge of a graphene plane, including carboxylic acid and hydroxyl groups. A large number of derivatives can be prepared from carboxylic acid alone. For instance, alcohols or amines can be easily linked to acid to provide stable esters or amides. If the alcohol or amine is part of a di- or poly-functional molecule, then linkage through the O— or NH— leaves the other functional group(s) as pendant group(s). For instance, we can have R—OH or R—$NH_2$, where R=alkyl, aralkyl, aryl, fluoroethanol, polymer, and $SiR'_3$. Examples include Cl—$SiR'_3$, HO—R—OH (R=alkyl, aralkyl, or $CH_2O$—), $H_2N$—R—$N_2H$ (R=alkyl, aralkyl), X—R—Y (R=alkyl, etc.; X=OH or $NH_2$; Y=SH, CN, C=O, CHO, alkene, alkyne, aromatic, or heterocycles).

As an example, Sample 4-a-10, was treated to follow the following reactions: R—COOH+Im-CO-Im→R—CO-Im+Him+$CO_2$ (Im=imidazolide) and Him=imidazole), which was followed by R—CO-Im+R'OH (in NaOEt)→R—CO—OR'+HIm, and, separately for another specimen, by R—CO-Im+R'$NH_2$→R—CO—NHR'+Him.

In summary, the presently invented process is superior to many prior art processes in several aspects:

1) Prior art high-temperature exfoliation processes were not followed by a high temperature de-oxygenation treatment. These processes did not allow for a good control over the oxygen content of the resulting GO platelets.
2) In another commonly used prior art approach, the graphite oxide dispersed in an aqueous solution was reduced with hydrazine, in the presence of a polymer, such as poly (sodium 4-styrenesulfonate). This process led to the formation of a stable aqueous dispersion of polymer-coated graphene platelets. In some applications, however, a polymer coating may be undesirable. Furthermore, the reducing agent, hydrazine, is a toxic substance.
3) Another prior art method of producing less hydrophilic GO platelets involved using an isocyanate treatment. However, unless stabilized by selected polymers, the chemically modified graphene sheets obtained through this method tended to precipitate as irreversible agglomerates due to their hydrophobic nature. The resulting agglomerates became insoluble in water and organic solvents. By contrast, the presently invented process provides a convenient approach to the preparation of soluble or dispersible nano graphene that, in most cases, requires no further chemical reduction.
4) Conventional processes of preparing GO nano sheets that included chemical exfoliation typically were extremely tedious. Such a long process is not amenable to the mass production of conductive nano graphene platelets. In these prior art processes, by subjecting the GO films to a high temperature treatment in a vacuum, one could obtain nano platelets with thin film electrical conductivity as high as 550 S/cm. However, once such a high temperature treatment was done, the GO nano sheets were no longer dispersible in water.
5) In the presently invented process, exfoliation and de-oxygenation can be conducted sequentially or concurrently using the same reactor, obviating the need to transfer the material to another reactor.
6) The presently invented process is capable of thermally decomposing most of the impurities, including those used for graphite intercalation/oxidation, obviating a need for washing and rinsing the GO platelets (which was required in the prior art solution approach to the exfoliation of GO and/or subsequent chemical reduction).

7) The presently invented process allows for the NGPs to be readily or easily functionalized. This is particularly useful if NGPs are used as a filler in a composite material.

8) The presently invented process enables us to have separate control over dispersibility and conductivity, which were considered mutually exclusive in the prior art.

The invention claimed is:

1. A process for producing a dispersible nano graphene or graphene oxide platelet material, said process comprising:
   (a) preparing a graphite intercalation compound (GIC) or graphite oxide (GO) from a laminar graphite material selected from the group consisting of artificial graphite, graphite fluoride, graphite fiber, carbon fiber, carbon nano-fiber, carbon nano-tube, mesophase carbon microbead (MCMB) or carbonaceous micro-sphere (CMS), soft carbon, hard carbon, and combinations thereof;
   (b) exposing said GIC or GO to a first temperature for a first period of time to obtain exfoliated graphite; and
   (c) exposing said exfoliated graphite to a second temperature in a protective atmosphere for a second period of time to obtain said dispersible nano graphene platelet material with an oxygen content no greater than 25% by weight.

2. The process as set forth in claim 1 wherein said protective atmosphere comprises an inert gas, nitrogen, hydrogen, a combination thereof, or vacuum.

3. The process as set forth in claim 1 wherein said second temperature is higher than said first temperature.

4. The process as set forth in claim 1 wherein said oxygen content is below 20% by weight.

5. The process as set forth in claim 1 wherein said oxygen content is below 15% by weight.

6. The process as set forth in claim 1 wherein said oxygen content is between 5% by weight and 20% by weight.

7. The process as set forth in claim 1 wherein said first temperature is between approximately 200° C. and 1,500° C.

8. The process as set forth in claim 1 wherein said first temperature is between approximately 800° C. and 1,300° C.

9. The process as set forth in claim 1 wherein said second temperature is between approximately 800° C. and 1,500° C.

10. The process as set forth in claim 1 wherein said second temperature is at least 1,000° C.

11. The process as set forth in claim 1 wherein said second temperature is at least 1,000° C. and the second period of time is at least 10 minutes.

12. The process as set forth in claim 1 wherein said second temperature is at least 1,100° C. and the second period of time is at least 5 minutes.

13. The process as set forth in claim 1 wherein said second temperature is at least 1,200° C. and the second period of time is at least 2 minutes.

14. The process as set forth in claim 1 wherein said dispersible nano graphene platelet material, when formed into a thin film with a thickness no greater than 100 nm, exhibits an electrical conductivity of at least 10 S/cm.

15. The process as set forth in claim 1 wherein said dispersible nano graphene platelet material, when formed into a thin film with a thickness no greater than 100 nm, exhibits an electrical conductivity of at least 50 S/cm.

16. The process as set forth in claim 1 wherein said dispersible nano graphene platelet material, when formed into a thin film with a thickness no greater than 100 nm, exhibits an electrical conductivity of at least 100 S/cm.

17. The process as set forth in claim 1 wherein said dispersible nano graphene platelet material, when formed into a thin film with a thickness no greater than 100 nm, exhibits an electrical conductivity of at least 600 S/cm.

18. The process as set forth in claim 1 wherein said nano graphene material has a specific surface area of from approximately 300 $m^2/g$ to 2,600 $m^2/g$.

19. The process as set forth in claim 1 wherein said nano graphene platelet material comprises single-layer graphene.

20. The process as set forth in claim 1 wherein said step of preparing a graphite intercalation compound (GIC) or graphite oxide (GO) comprises subjecting said laminar graphite material to an acid and/or an oxidizer.

21. The process as set forth in claim 1 wherein said step of preparing a graphite intercalation compound (GIC) or graphite oxide (GO) comprises subjecting said laminar graphite material to an acid and/or an oxidizer selected from sulfuric acid, nitric acid, carboxylic acid, sodium or potassium nitrate, potassium permanganate ($KMnO_4$), sodium or potassium chlorate, hydrogen peroxide ($H_2O_2$), or a combination thereof.

22. The process as set forth in claim 1, further comprising a step of contacting the nano graphene platelet material obtained in step (c) with a reactant such that a functional group is added to a surface or edge of the nano graphene platelet material.

23. The process as set forth in claim 22, wherein said functional group is selected from alkyl or aryl silane, alkyl or aralkyl group, hydroxyl group, carboxyl group, amine group, sulfonate group (—$SO_3H$), aldehydic group, quinoidal, fluorocarbon, or a combination thereof.

* * * * *